United States Patent

Oka

[15] 3,639,880
[45] Feb. 1, 1972

[54] SLIDING-TYPE VARIABLE RESISTOR
[72] Inventor: Shunzo Oka, Hirakata, Japan
[73] Assignee: Matsushita Electric Industrial Co., Ltd., Osaka, Japan
[22] Filed: Sept. 17, 1970
[21] Appl. No.: 73,012

[30] Foreign Application Priority Data

| Sept. 27, 1969 | Japan | 44/92322 |
| Sept. 27, 1969 | Japan | 44/92323 |
| June 5, 1970 | Japan | 45/55883 |
| June 12, 1970 | Japan | 45/58704 |

[52] U.S. Cl............................................338/183, 338/176
[51] Int. Cl..............................................H01c 9/02
[58] Field of Search................................338/178–183, 184; 308/5 R

[56] References Cited

UNITED STATES PATENTS

| 3,566,330 | 2/1971 | Ichikawa et al. | 338/183 X |
| 2,604,363 | 7/1952 | Daugherty | 308/5 |
| 2,559,237 | 7/1951 | Waller | 308/5 X |

*Primary Examiner*—Laramie E. Askin
*Assistant Examiner*—D. A. Tone
*Attorney*—Stevens, Davis, Miller & Mosher

[57] ABSTRACT

A sliding-type variable resistor comprising a baseplate with resistance elements and conductive elements disposed on the upper side thereof; a sliding block with contactors disposed on the lower side thereof and with a plate spring and an operating means provided on the upper side thereof, the contactors being maintained in contact with the resistance elements and the conductive elements; a housing which covers the baseplate in such a manner as to contain therein the sliding block; an operating means having a thumb fitting attached to the sliding block and being projected through the slot on the upper side of the housing; and a friction plate disposed on the upper surface of the sliding block and pressed against the ceiling of the housing by means of the plate spring, a gaseous grease layer being interposed between the ceiling of the ceiling of the housing and the friction plate so that a smooth sliding operation may be assured.

5 Claims, 6 Drawing Figures

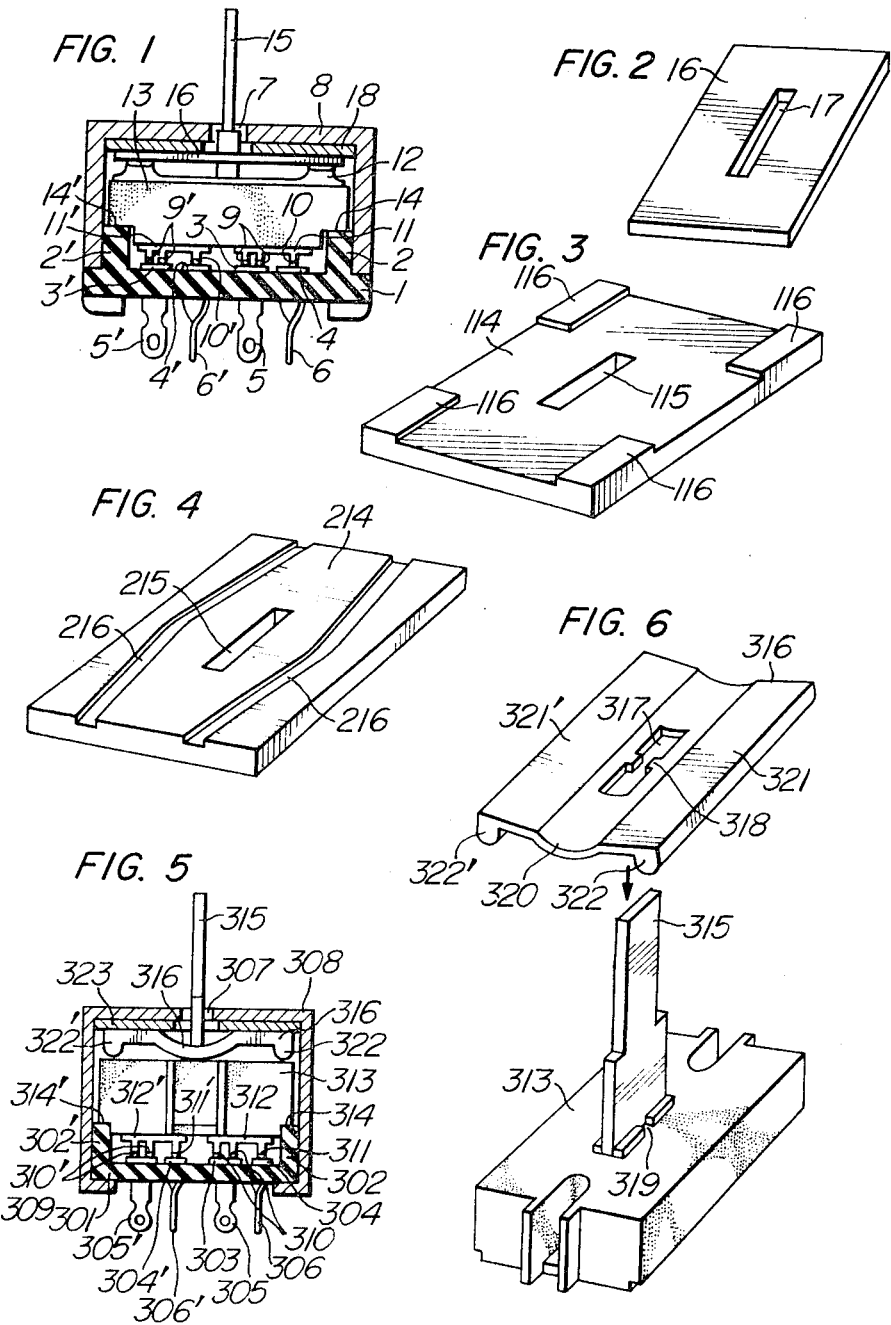

SLIDING-TYPE VARIABLE RESISTOR

The present invention relates to a sliding-type resistor which starts to slide very smoothly, and thus enable fine adjustment.

In the conventional sliding-type variable resistor, a plate spring is disposed on a slide block between a housing and a baseplate in such a manner to be in contact with a covering plate installed on the ceiling of said housing. In this construction, the plate spring is in contact with a covering plate at a point, and therefore cannot function to satisfactory degree even by the agency of a grease layer therebetween. Also, this arrangement lacks a smoothness in sliding movement and enables no fine adjustment.

Accordingly, it is an object of the present invention to provide as improved sliding-type variable resistor which has a friction plate of metal or plastic mold inserted between said plate spring and said covering plate, with a grease layer being provided between the friction plate and the covering plate so that a smooth sliding operation may be achieved. The friction plate is fitted into an operating means above the center of the sliding block in such a manner as to be pressed upward against the covering plate on the ceiling of the housing by the force of the plate spring which is also located on the upper side of the sliding block. As a consequence, the covering plate is kept in contact with the friction plate face to face by operating the operating means with the result that a grease layer always exists between the covering plate and the friction plate, smoothing the sliding operation without the waste of any sliding energy.

It will be seen from the above description that the device of the present invention has such a simple and low-cost construction that its practical value is very great.

The above and other objects, features and advantages will be made apparent by the detailed description taken in conjunction with the accompanying drawings, in which:

FIG. 1 is a diagram showing a cross-sectional view of an embodiment of the sliding-type variable resistor according to the present invention;

FIG. 2 shows a perspective view of a friction plate used with said sliding-type variable resistor;

FIG. 3 is a perspective view of a friction plate for use with another embodiment of the present invention;

FIG. 4 is a perspective view of a friction plate for use with still another embodiment of the present invention;

FIG. 5 shows a partially exploded cross-sectional view of still another embodiment of the sliding-type variable resistor according to the present invention; and FIG. 6 shows a perspective view of the main components of said sliding-type variable resistor.

Referring to FIG. 1, the reference numeral 1 shows a baseplate made of a dielectric material, on both sides of which are formed protruded rails 2 and 2' which act as guides. On the baseplate 1 are placed resistance elements 3 and 3' and the conductive elements 4 and 4' in parallel with one another. External terminals 5 and 5' and also 6 and 6' are located on the lower side of the baseplate and connected with the resistance elements 3 and 3' and also 4 and 4' respectively. A box-type housing 8 made of metal and with a sliding slot thereon is covered on the baseplate 1. This housing contains a sliding block 13 with a plate spring 12 on the upper side thereof for pressing itself against the ceiling of the housing and with contactors 11 and 11' of an elastic metal fixed to the lower side thereof, which contactors are provided with feet 9 and 9' and also 10 and 10' which slide on the resistance elements 3 and 3' and also the conductive elements 4 and 4' respectively. Both lower sides of the sliding block 12 are cut to form recesses 14 and 14' which are engaged with the protruded rails 2 and 2' of the baseplate. The sliding block has also at the center of the upper side thereof an operating means 15 which is projected through the sliding slot 7 out of the housing 8. By manipulating this operating means 15, the sliding block slides in a horizontal direction by being guided by the protruded rails 2 and 2' of the baseplate and with its feet 9 and 9' and also 10 and 10' maintained in contact with the resistance elements 3 and 3' and the conductive elements 4 and 4'. The numeral 16 shows a friction plate made of a flat plastic mold with a fitting slot in the central portion thereof as shown in FIG. 2, through which the friction plate is fitted to the operating means 15. As described above, this friction plate 16 is supported by the plate spring 12 while being pressed upward against the covering plate 18 at all times. Although not shown in the drawing, a grease layer is provided between the friction plate 16 and the covering plate 18.

Instead of pressing into contact with the covering plate 18, the friction plate 16 may be pressed against the ceiling of the box-type housing 8 by the agency of a grease layer without the interposition of the covering plate, if said ceiling is smooth enough. Also, the friction plate of plastic mold mentioned above may be replaced by that of a metal.

Another friction plate made of a plastic mold is shown in FIG. 3, in which the numeral 115 denotes a fitting slot by means of which the friction plate is attached to the operating means 15. This friction plate is provided with small projections 116 at the four corners thereof integrally with the friction plate. As in the case of the friction plate for the first embodiment mentioned earlier, this friction plate 114 is always pressed into contact with the covering plate 18 placed on the ceiling of the housing 8, and also there is a grease layer between the friction plate 114 and the covering plate 18.

These small corner projections 116 are adapted to prevent the grease from escaping outside of the contact surfaces by the repeated slidings, and to eliminate the necessity to apply an increased force for the sliding operation. The four corner projections made possible a very smooth sliding of the sliding block, which facilitates the fine adjustment of the resistor.

FIG. 4 illustrates still another friction plate made of a plastic mold. The upper surface of this friction plate is provided with grooves 216 which are curved inside on both sides of the sliding slot 215. This friction plate is fitted into the operating means 15 and pressed upward by the plate spring 12 in such a manner as to come into contact with the covering plate 18 on the ceiling of the box-type housing 8, a grease layer not shown in the drawing being provided between the friction plate 214 and the covering plate 18. These curved grooves enable the grease applied on the surface of the friction plate 214 to uniformly extend over the whole surface of the friction plate along the curved grooves, thereby saving any wastage of energy in sliding the resistor.

There may be no need for the covering plate 18, if the ceiling of the box-type housing 8 is smooth enough, in which case the friction plate 214 is brought into contact with the ceiling of the housing 8 with a grease layer interposed therebetween.

Like the four corner projections mentioned in connection with the second embodiment above, provision of the curved grooves in the present embodiment prevents the grease existing between the friction plate and the covering plate or the ceiling of the housing 8 from being squeezed out as a result of the repeated sliding operations. Thus the curved grooves ensure the smooth movement of the sliding block over a long period of time.

Still another embodiment of the invention is shown in FIGS. 5 and 6, in which the reference numeral 301 shows a baseplate made of an insulating material, on both sides of which are formed protruded guide rails 302 and 302' in the longitudinal direction. Resistance elements 303 and 303' and conductive elements 304 and 304' are disposed on the baseplate in parallel with each other, and they are connected with the terminals 305, 305', 306 and 306' respectively outside of the baseplate. A box-type housing 308 made of metal and provided with a sliding slot 307 on the upper side thereof is covered on the baseplate by means of hooks 309. Inside of this box-type housing 308 is installed a sliding block 313 with feet 310, 310', 311 and 311' fixed on the contactors 312 and 312' of an elastic metal, said feet being made to slide on the resistance elements 303 and 303' and the conductive elements 304 and 304' respectively. The recesses 314 and 314' formed along the lower edges of the sliding block 313 are engaged with the protruded rails 302 and 302' of the baseplate 301. At the center of the sliding block 313 is disposed an operating means 315 integrally with the sliding block 313 in such a manner as to be projected outside of the box-type housing 308 through the sliding slot 307. By the operation of this operating means 315, the sliding block 313 is caused to slide in a horizontal direction by being guided along the protruded rails 312 and 312' of the baseplate 301 which are engaged with recesses 314 and 314', the feet 310, 310', 311 and 311' of the contactors 312 and 312' being maintained in contact with the resistance elements 303 and 303' and also the conductive elements 304 and 304' respectively. At the lower end of the operating means 315 are provided recesses 319 to receive the projections 318 formed in the central slot 317 of the friction plate 316. This friction plate 316 is mounted on the operating means 315 through the central slot 317 and fixed on the sliding block 313 by fitting the projections 318 into the recesses 319. This friction plate 316 has its central zone 320 sunk and therefore the side portions 321 and 321' are curved upwards, thereby giving the friction plate an elastic character. As described above, the friction plate 316 is provided with a couple of projections 322 and 322' on the lower side thereof to stabilize the operating means 315 in position. The numeral 323 shows a covering plate attached on the ceiling of the box-type housing 308 and is supported by the friction plate 316, with the side portions 321 and 321' of the friction plate 316 being in contact, face to face, with the covering plate.

The present embodiment of the sliding-type variable resistor with the above-mentioned construction has a friction plate which is constructed so elastically that the same effect is realized as if a spring is integrated with a friction plate. In addition, the number of required components is reduced, whereby the operating means is made more stable and the number of assembly processes can be reduced. As in the case of the other embodiments, the covering plate 323 may be eliminated with the friction plate 316 made directly in contact with the ceiling of the box-type housing 308, if the surface of said ceiling is smooth enough.

What is claimed is:

1. A sliding-type variable resistor comprising a baseplate with a square-groove-shaped cross section; a couple of protruded guide rails for guiding a sliding block being provided along both sides of said baseplate; resistance elements and conductive elements being disposed in parallel with each other on said baseplate; a sliding block with contactors fixed on the lower side thereof and with a plate spring and an operating means disposed on the upper side thereof, said sliding block being made to slide on said baseplate in a horizontal direction while said contactors are maintained in contact with said resistance elements and conductive elements; a box-type housing mounted on said baseplate in such a manner as to contain said sliding block and provided with a slot on the upper side thereof in such a manner as to allow said operating means to move along said slot, said operating means being projected through said slot; a friction plate fixed at the foot of said operating means of said sliding block and pressed against the ceiling of said housing by means of a plate spring disposed on said sliding block, said friction plate being made to slide together with said sliding block; and a grease layer being interposed between said ceiling of the housing and said friction plate.

2. A sliding-type variable resistor according to claim 1, in which said friction plate is flat.

3. A sliding-type variable resistor according to claim 1, in which said friction plate is provided with square protrusions with a very small surface area at the four corners of the upper side thereof contacting the ceiling of said housing.

4. A sliding-type variable resistor according to claim 1, in which said friction plate is provided with curved grooves in the longitudinal direction on the upper side thereof contacting the ceiling of said housing.

5. A sliding-type variable resistor comprising a baseplate with a square-groove-shaped cross section, a couple of protruded guide rails for guiding a sliding block being provided along both sides of said baseplate; resistance elements and conductive elements being disposed in parallel with each other on said baseplate; a sliding block with contactors fixed on the lower side thereof and with an operating means disposed on the upper side thereof, said sliding block being made to slide on said baseplate in a horizontal direction while said contactors are maintained in contact with said resistance elements and conductive elements; a box-type housing mounted on said baseplate in such a manner as to contain said sliding block and provided with a slot on the upper side thereof in such a manner as to allow said operating means to move along said slot, said operating means being projected through said slot; a friction plate fixed at the foot of said operating means of said sliding block, said friction plate having a curved portion of resilient material and two flat portions each having a flat upper surface and extended laterally from both sides of said curved portion, said friction plate being disposed between said sliding block and the ceiling of said housing in such a manner that said curved portion is biased to contact each of said flat surfaces to the ceiling of said housing with a grease layer therebetween, whereby said flat surfaces are pressed to said ceiling through said grease layer by the force of said biased curved portion of said friction plate.

* * * * *